F. X. LAUTERBUR.
FLOUR WEIGHING, BLENDING, ELEVATING, AND SIFTING MACHINE.
APPLICATION FILED FEB. 17, 1919.

1,434,618.

Patented Nov. 7, 1922.

F. X. LAUTERBUR.
FLOUR WEIGHING, BLENDING, ELEVATING, AND SIFTING MACHINE.
APPLICATION FILED FEB. 17, 1919.

1,434,618.

Patented Nov. 7, 1922.

Inventor
Frank X. Lauterbur.
By Harry J. Riley
Attorneys

Witness
P. J. Gathmann

Patented Nov. 7, 1922.

1,434,618

UNITED STATES PATENT OFFICE.

FRANK X. LAUTERBUR, OF SIDNEY, OHIO.

FLOUR WEIGHING, BLENDING, ELEVATING, AND SIFTING MACHINE.

Application filed February 17, 1919. Serial No. 277,492.

*To all whom it may concern:*

Be it known that I, FRANK X. LAUTERBUR, a citizen of the United States, residing at Sidney, in the county of Shelby and State of Ohio, have invented certain new and useful Improvements in Flour Weighing, Blending, Elevating, and Sifting Machines, of which the following is a specification.

The invention relates to a flour weighing, blending, elevating and sifting machine.

The object of the present invention is to provide a simple, practical and efficient machine of strong, durable and comparatively inexpensive construction designed for handling flour and similar material and for preparing the same for depositing such material into a dough mixer and capable of enabling the material to be accurately weighed, and adapted to blend uniformly a plurality of different grades of flour or other material, and capable also of elevating such material and of sifting the same in an elevated position and of depositing the sifted material in a dough mixer.

It is also an object of the invention to provide a machine of this character in which the gearing and other instrumentalities will not interfere with the act of weighing of the material, and in which the flour may be handled directly from the bin or receptacle in which the material is weighed without the movement of the weighing mechanism incident to the gradual decrease in the weight of the material thereon, affecting the continuous operation of the machine in removing the material from the bin or receptacle, blending the several grades or kinds of material and sifting and depositing the material in a dough mixer.

A further object of the invention is to provide a flour blending, elevating and sifting machine which, while in its more complete embodiment will be capable of the movement of various parts incident to both the weighing operation and the movement of the weighing mechanism incident to conveying the material from the same, may be installed in rigid mountings without the provision of the weighing mechanism or the means for blending a plurality of grades or kinds of material.

Another object of the invention is to equip the machine with an efficient sifting means for enabling any foreign substances contained in the material to be completely removed therefrom, and the flour or other material delivered to a dough mixer in the best possible condition for use in such machine.

Another object of the invention is to equip the machine with improved drive mechanism, capable of convenient control of the mechanism for feeding, conveying and sifting the flour or other material, and adapted to be operated from the main shaft of the dough mixer machine or other source of power.

With this and other objects in view, the invention consists in the construction and novel combination of parts hereinafter fully described and illustrated in the accompanying drawings and pointed out in the claims hereto appended, it being understood that various changes in the form, proportion, size and minor details of construction, within the scope of the appended claims, may be resorted to without departing from the spirit or sacrificing any of the advantages of the invention.

In the drawings.

Like numerals of reference designate corresponding parts in the several figures of the drawing.

Referring particularly to Figures 1 to 4, inclusive, in which the invention has associated with it the weighing mechanism, 1 designates a bin mounted upon a platform scale 2 and divided by vertical partitions 3 into a plurality of separate compartments 4 adapted to receive a plurality of different grades of flour or different kinds of material for enabling the same to be blended. The lower portion of the bin communicates with a casing 5 of the lower horizontal screw conveyer 6 which carries the material from the compartments 4 of the bin 1 to a vertical elevator 7. In order to positively deliver the flour or other contents of the compartments of the bin to the screw conveyer, the bin is equipped with an agitator consisting of a horizontally disposed shaft 8 journalled in suitable bearings of the bin and equipped with agitator arms or member 9 located in each of the compartments 4 and adapted to pass through the contents of the bin and break up lumps thereof and to prevent the material from banking up in the compartments and remaining therein. The agitator arms are shown in the form of U-shaped loops or members, but they may be of any other desired form, and they will enable the materials of the several compartments of the bin to be uniformly and accurately blended. In order to compensate for the small amount of material which will naturally adhere to the interior of the bin, the lower screw conveyer, the elevator 7 and the upper screw conveyer 10, the platform scale is provided with a counter-balancing weight 11 and a scale beam 12 receiving the said weight and adapted to permit various adjustments to be made to properly allow for such material, so that an accurate weighing of the material delivered to the dough mixer 13 may be made. The agitator shaft 8 is connected with the outer end of the shaft 14 of the screw conveyer 6 by sprocket gearing, consisting of an upper sprocket wheel 15, a lower sprocket pinion 16 and a chain belt 17, and the agitator is adapted to be driven at a relative slow speed and will produce a proper feeding of the material to the lower screw conveyer.

The lower screw conveyer delivers, at its inner end, the material to the elevator 7, which consists of a vertical casing 18, buckets 19 and endless belts 20 carrying the buckets and arranged on lower wheels 21 and 22 and upper wheels 23, and 24, the wheel 24 being arranged in an outwardly off set position for causing the buckets to project over and positively deliver the material into the casing 26 of the upper screw conveyer 10. The belt 20 may be a plain or chain belt, and the upper and lower wheels are arranged to form front and rear vertical flights, top and bottom horizontal flights, and a short inclined flight 27 extending from the wheel 24 to the wheel 25. The top flight of the endless belt extends rearwardly beyond the lower horizontal flight in order to enable the buckets to dump their contents into the casing 26 of the upper screw conveyer 10. The buckets 19 receive the material at the bottom of the elevator casing and they travel upwardly at the front flight of endless belt and in an upright position and they are turned to a substantially horizontal position at the front upper wheel 23, and they travel rearwardly in such position until they assume an inclined position in passing around the rear side of the wheel 24, the material being dumped while the buckets are in such inclined position. The casing of the lower horizontal conveyer extends partially into the lower portion of the bins, as clearly illustrated in Figure 4 of the drawings, and the inner end of the screw conveyer is arranged partially within the lower front portion of the casing of the vertical elevator. The lower screw conveyer and the vertical elevator are mounted upon the platform of the section 2 and are supported by the weighing mechanism of the scale, which may be of any desired construction, as will be readily understood, and as any suitable construction of weighing mechanism may be employed, a specific description of the same is deemed unnecessary.

The upper screw conveyer which extends horizontally from the upper portion of the vertical elevator is provided at its outer end with a depending outlet 28, which extends into a relatively fixed receiver or casing 29 of a vibratory sifter 30, a telescoping fit being provided and a sufficient play of the outlet being afforded to compensate for the up and down movement of the parts through the action of the platform scale, both during the weighing operation when the parts are carried downward by the introduction of the material into the bin and the upward movement of the parts resulting from conveying the material from the bin and depositing the material into the casing 29. The outer portion of the bin is connected with the upper end of the casing 18 of the vertical elevator by side inclined brace 31, and the top of the elevator casing is connected with the outer end of the upper screw conveyer casing by a top inclined brace 32, and the two braces preferably consist of a single bracing member having a connecting portion 33, suitably secured to the top of the elevator casing. The lower end of the side brace and the outer end of the top brace are suitably secured to the bin and the casing of the upper screw conveyer, and a rigid unitary structure is thereby provided. Any other suitable bracing means may, of course, be employed, and the size and strength of the bracing means may be varied to meet the requirements of the particular machine in which they are employed.

Motion is communicated from the vertical elevator to the lower screw conveyer by means of exteriorly arranged sprocket gearing consisting of upper and lower sprocket wheels 34 and 35 and a connecting sprocket chain 36. The upper sprocket wheel 34 is connected with one of wheels of the vertical elevator and the lower sprocket wheel 35 is mounted on the inner end of the shaft 14 of the lower screw conveyer.

Figure 1:
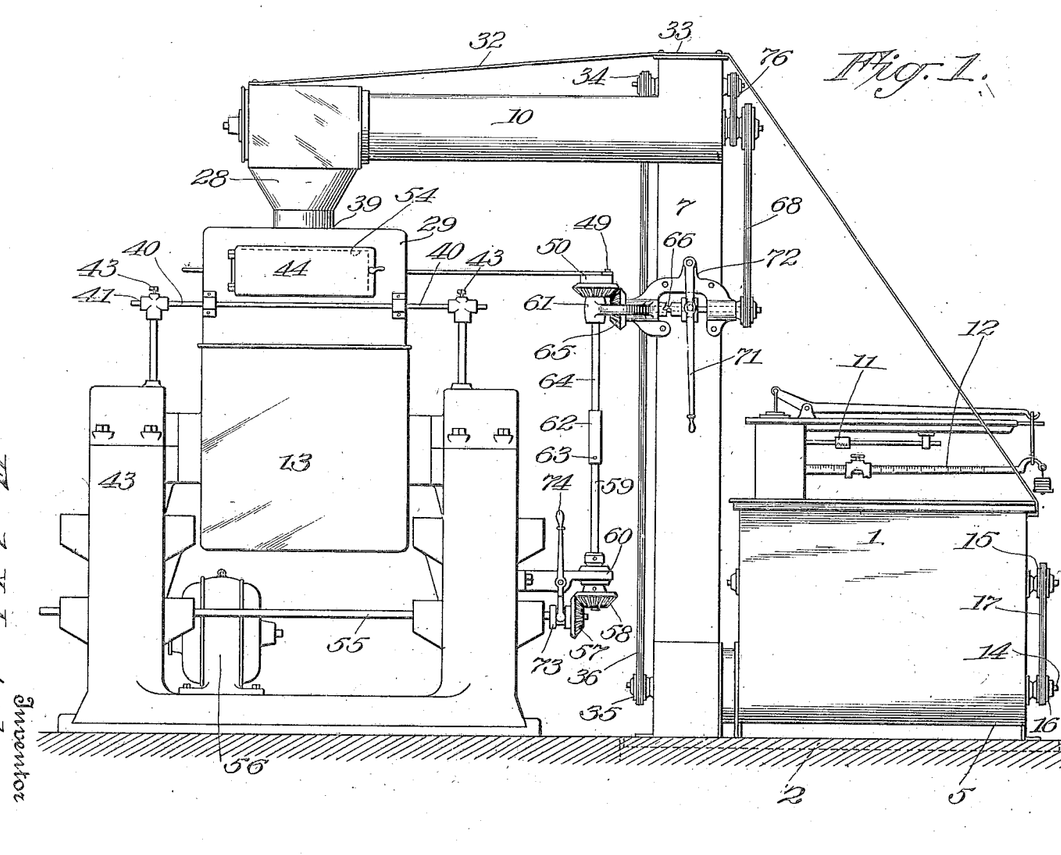
Figure 1 is a front elevation of a flour weighing, blending, elevating and sifting machine constructed in accordance with this invention.
Figure 2:
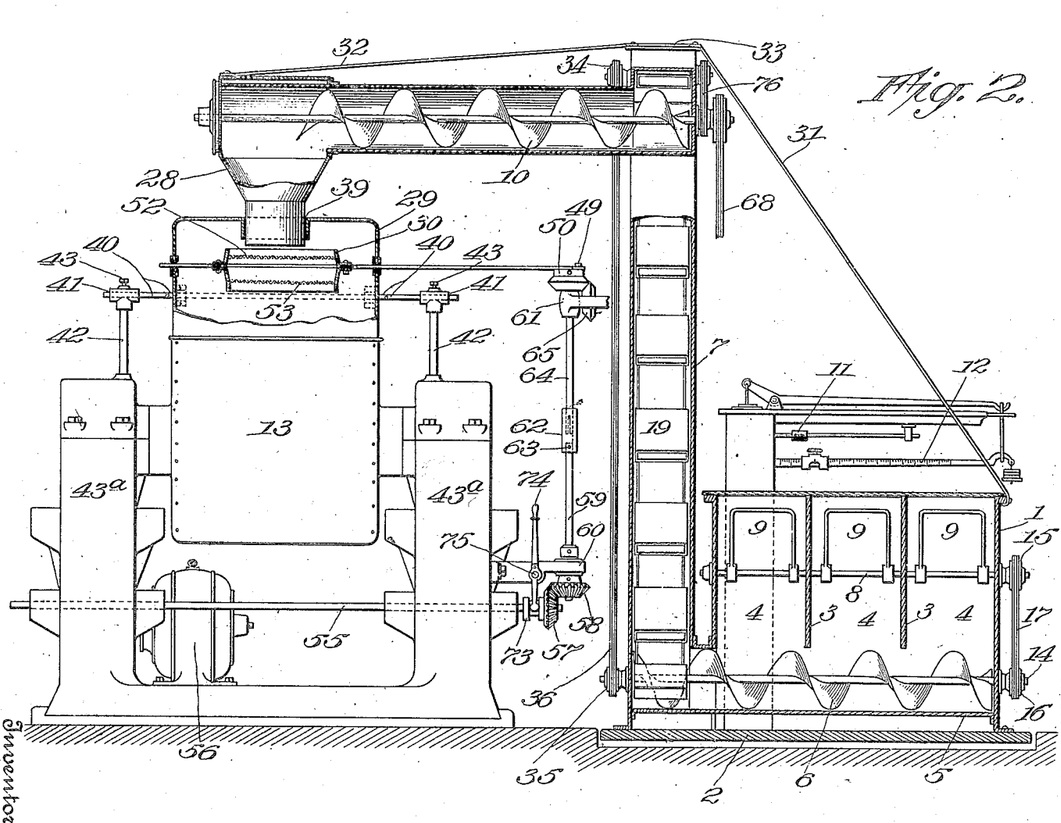
Figure 2 is a vertical longitudinal sectional view of the same.
Figure 3:
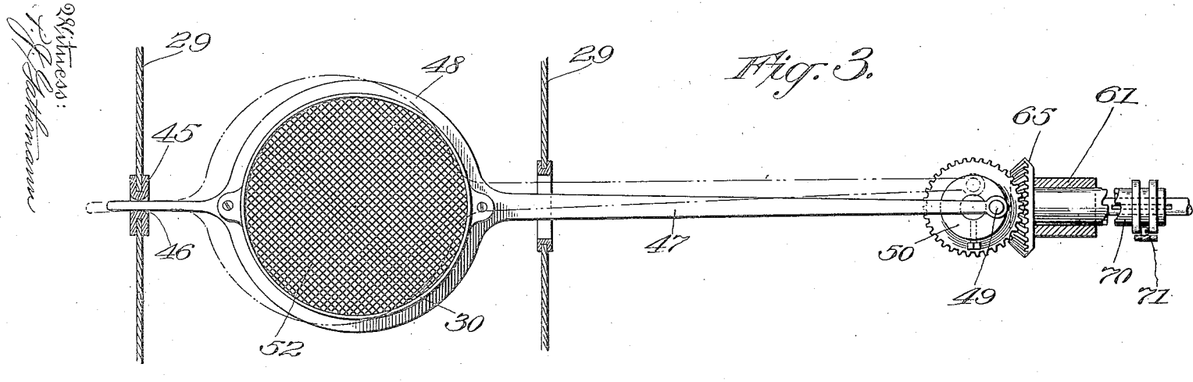
Figure 3 is a horizontal sectional view, illustrating the manner of mounting the vibratory sifter.
Figure 4:
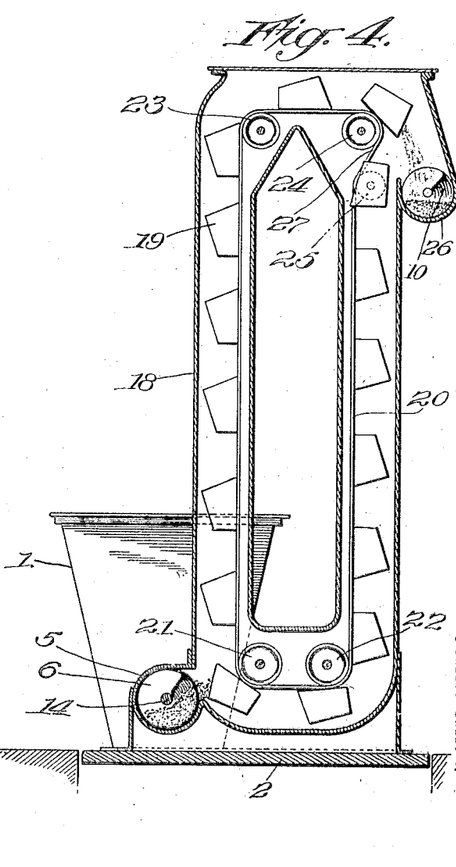
Figure 4 is a vertical sectional view through the elevator.
Figures 6, 8:
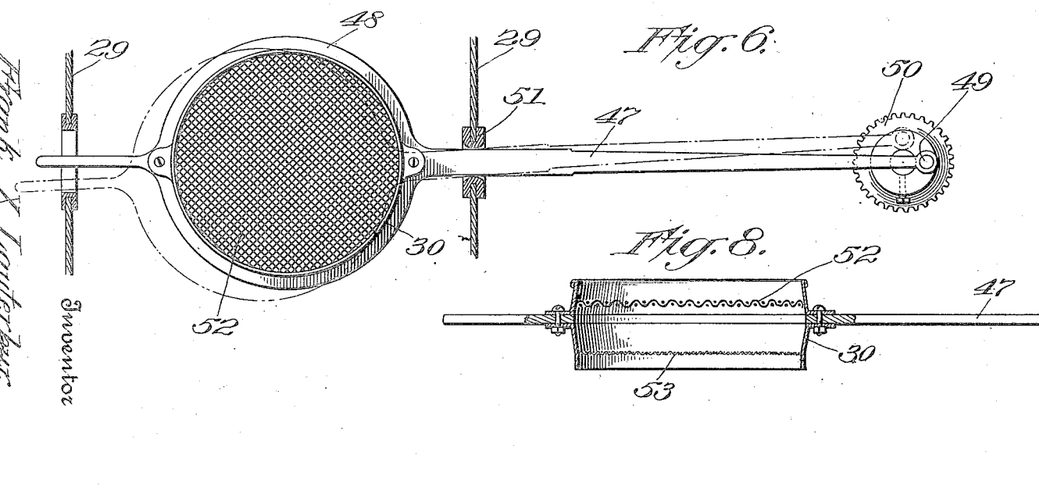
Figure 6 is a detailed sectional view, illustrating a modification of the guiding means for the vibratory sifter.
Figure 8 is a detailed section of the vibratory sifter.
Figure 9:
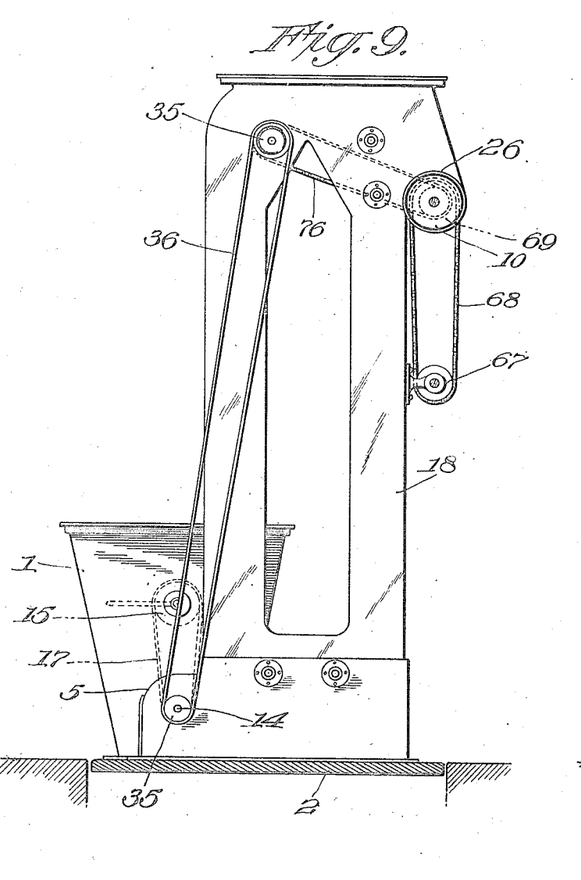
Figure 9 is a side elevation of the vertical elevator.

The casing 29, which is provided at the top with an inlet 39 to receive the outlet of the screw conveyer, is supported by one or more horizontal rods or members 40 secured in openings 41 of post 42 by set screws 43 or other suitable fastening means adapted to permit the rods to be readily secured to and removed from the post and adjusted to arrange the sifter casing in proper position with relation to the outlet of the upper conveyer casing. The post 42 is suitably mounted upon the columns 43$^a$ of the dough mixer but it will be readily apparent that while the construction shown in the accompanying drawings is advantageous and results in a unitary structure, the sifter casing may be supported in any other desired manner, such as by securing it to a wall, suspending it from a ceiling or any other equivalent means. The casing or housing is provided with a suitable door 44 adapted to afford access to the interior of the sifter casing or housing to enable the sifter 30 to be readily removed and replaced by a sifter having sieves or screens of a different mesh or for the enabling of foreign matter to be readily removed from the sifter or for any other purposes. The door is arranged at the front of the casing or housing 29, which is provided with a suitable door or support 45, having an oppositely flared slot or opening 46 forming a guide for a rod or member 47 which carries the vibratory sifter 30. The rod or member 47, which may be provided at an intermediate point with a collar or band 48 to facilitate the attachment of the vibratory sifter 30, may be of any other desired construction and while the vibratory sifter is shown of circular form, it may, of course, be of any other desired form. One end of the rod or member 47 is guided in the slot of opening 46 of the combined guide and bearing 45 and the other end of the rod or member 47 is connected with a crank element 49 which may consist of a wrist pin carried by a horizontal gear wheel 50 which, when rotated, reciprocates the rod or member 47 and also imparts a lateral movement to the same, so that when the vibratory sifter is actuated it will be given a backward and forward movement and also a lateral or sidewise movement, and the movements of the vibratory sifter will be closely similar to the hand, in operating a hand sifter. The opposite walls of the slot or opening 46 are preferably convexly curved as illustrated in Figure 3 of the drawing, and while the combined guide and bearing 45 is located at the outer end of the rod or member 47 it will be apparent that it may be arranged at an intermediate point as shown at 51 in Figure 6 of the drawings. There is sufficient play of the parts at the connection of the rod or member 47 with the actuating means to permit the necessary vertical oscillation incident to the weighing operation and the vertical movement is relatively slight.

The movements of the vibratory sifter may be varied by varying the distance between the crank element 49 and the center of the rotary element or gear wheel 50, the movements being increased by increasing the distance of the wrist pin from the center of the wheel 50. The vibratory sifter 30 consists of a casing and one or more flat sieves or screens, a pair of sieves or screens 52 and 53 being shown in the accompanying drawings. The upper sieve or screen 52 is designed to be of a coarse mesh, say of one inch, for breaking up any lumps forming in the material and the lower sieve or screen 53 is designed to be of relatively small mesh for effecting a final separation of impurities or foreign matter from the material fed to the dough mixer 13. The inner end of the rod or member 47 of the vibratory sifter is detachably secured to the wrist pin 49 by any suitable means, and when it is disconnected from the wrist pin the vibratory sifter may be readily removed from the casing through the door opening 54 of the casing or housing 29. The casing or housing 29 is opened at the bottom and the material passing through the vibratory sifter is readily deposited in the dough mixer during the operation of the machine, which is associated with and which receives its motion from the main shaft 55 of the dough mixer.

The dough mixer, which is preferably operated by an electric motor 56, is connected by beveled gears 57 and 58 with the lower end of the vertical shaft 59, which is journalled in the lower bearing bracket 60 and in an upper bearing bracket 61 and composed of upper and lower sections telescopically connected by a coupling sleeve 62. The lower bearing bracket is preferably mounted upon the adjacent column 43 of the dough mixer and has a coupling sleeve secured to it by suitable fastening device 63, which may consists of a pin or key, a clamping screw or any other suitable means, and the upper section, which is mounted in the bearing bracket 61 is adapted to telescope vertically into the sleeve with the movements of the mechanism incident to the weighing operation and also to the removal of the material from the platform scale incident to the operation of the machine. The interior of the sleeve may be square or any other non-circular shape, and the upper end of the upper section 64 of the vertical shaft 59 has the rotary gear element 50 secured to it. The upper rotary gear element 50 is preferably in the form of a beveled gear which meshes with a vertical beveled gear 65 on a horizontal shaft 66 journalled in the bearing bracket 61 and also carrying a sprocket pinion 67 which receives the sprocket chain 68 extending from the sprocket pinion of the shaft 66 to a sprocket wheel 69 which is connected with the shaft of one of the wheels of the vertical elevator. The sprocket wheel 65 is loose on the shaft 66, which is horizontally disposed and which extends across the upper portion of the casing of the vertical elevator, exteriorly thereof, and the said sprocket pinion 65 is connected with and disconnected from the shaft 66 by a suitable clutch 70, having a movable member actuated by a hand lever 71. The clutch may be of any desired construction and the movable member is thrown into and out of engagement by the oscillation of the lever 71, which is fulcrumed at its upper end to a suitable bracket 72. The main shaft 55 of the dough mixer is also equipped with a suitable clutch 73 which is controlled by a lever 74 fulcrumed at an intermediate point at 75 on the bearing bracket 60 and adapted to be operated to connect the lower vertical bevel gear 57 to the shaft 55 and disconnect it therefrom to throw the vibratory sifter into and out of operation. The upper screw conveyor 10 is connected with the elevator by sprocket gearing 76 or other suitable means and in starting the machine the clutch lever 74 is first operated to start the vibratory sifter and motion is communicated to the same through the beveled gearing and the vertical shaft, which actuates the upper rotary element and which carries the wrist pin or crank element for reciprocating the rod or member of the vibratory sifter. The shift lever 71 is then operated to transmit motion from the vertical shaft to the elevator, the upper and lower screw conveyers, and the agitator of the bin or receptacle 1. Previous to the starting of the machine, the material to be delivered to the dough mixer is weighed in the bin by means of the platform scale, and the telescopic coupling sleeve connection between the upper and lower sections of the vertical shaft will permit the weighing operation without the drive gear interfering with such weighing operation, and the material weighed in the bin 1 will cause a downward movement of the bin, the elevator and the upper and lower horizontal screw conveyers, and as the material is removed from the bin by the machine, the mechanism supported by the platform scale will gradually move upwards until the weight due to the weight of the material within the bin is entirely removed from the platform scale. The telescopic sleeve connection between the sections of the vertical shaft, permits this upward movement of the mechanism carried by the platform scale, without affecting the operation of the drive gearing. Also the joint connection formed by the outlet and the casing or housing of the sifter, permits the upward and downward movement of the mechanism carried by the platform scale without disconnecting the parts.

Figures 5, 7:
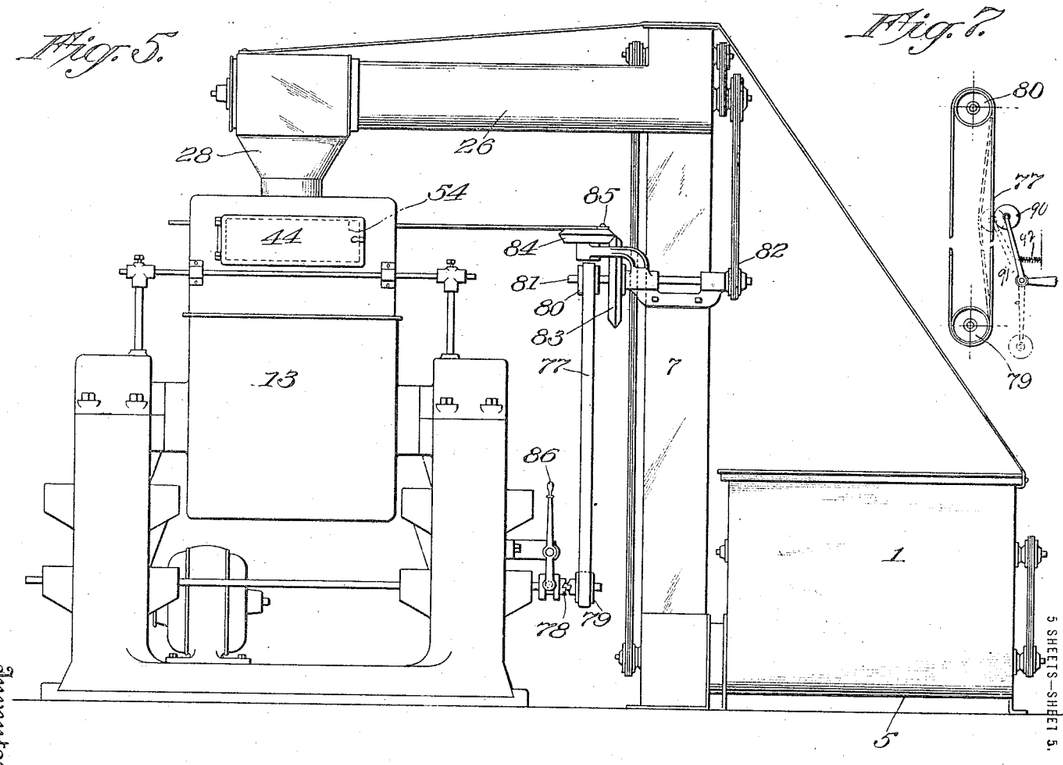
Figure 5 is an elevation illustrating an embodiment of the invention in which the weighing mechanism is omitted and in which a different form of drive having a single clutch, is employed.
Figure 7 is a vertical sectional view illustrating the arrangement of the belt drive of a machine equipped with weighing mechanism.

While the mounting of the bin, the elevator and the upper and lower screw conveyers upon the platform scale, form an especially advantageous outfit for weighing, blending and elevating and sifting the flour or other material, it will be apparent that the bin, the elevator, the upper and lower horizontal screw conveyers, and the casing of the vibratory sifter, may be permanently supported by securing them either to the floor or wall or suspending them from the ceiling and instead of employing spur gearing for transmitting motion from the main shaft of the dough mixer to the vibratory sifter and the elevator, a belt 77 and a single clutch 78 may be employed as illustrated in Figure 5 of the drawings.

In the embodiment of the invention illustrated in Figure 5 of the drawings, in which the various instrumentalities are fixed instead of being mounted for movement to permit the operation of the weighing mechanism, the dough mixer is provided at one end of the main shaft with a pulley 79 to receive the said belt 77 which extends from the said pulley 79 to a pulley 80 of a horizontal shaft 81 mounted upon the vertical elevator at the upper portion thereof in suitable bearings, and having the said pulley 80 arranged at its inner end. Its outer end is connected by sprocket gearing 82 with the vertical elevator, which is connected with the upper screw conveyer, as heretofore described. Mounted upon the horizontal shaft 81 is the vertically disposed beveled gear 83 which meshes with a horizontally disposed rotary gear element 84 which carries a wrist pin 85 for actuating the rod or member of the vibratory sifter in the manner hereinbefore described. The clutch 78 for controlling the belt drive mechanism, may be of any desired construction, and it is equipped with an operating lever 86 for throwing the belt drive into and out of operation. By employing the belt drive, a single clutch enables the vibratory sifter and the vertical elevator, upper and lower screw conveyers, and the agitator of the bin to be started and stopped.

While the belt drive, is illustrated in the accompanying drawings in connection with a readily supported vertical elevator, bin and upper and lower conveyers, it may, of course, be used on machines equipped with the weighing mechanism to accommodate the belt drive to the vertical movement of the parts incident to the use of the weighing mechanism, the belt will be equipped with a tension device located between the lower and upper pulleys 79 and 80 and consisting of a spring pressed pulley 90 carried by a pivoted arm or member 91 and adapted to be swung downward to the position indicated in dotted lines in Figure 7 of the drawings to slacken the belt during the weighing operation so that the tension device will not interfere with the proper weighing of the material. After the material within the bin has been weighed, the tension device is adapted to be swung into engagement with the adjacent fly of the belt 77 and it is pressed against the belt by a coiled spring 92 which is disengaged from the arm or member preparatory to swinging the tension device downward when it is desired to release the belt. The arm may be pivotally mounted in any desired manner and the spring is shown detachably interlocked at one end with the arm or member 91 and with a suitable support at the other end, but any other means may, of course, be employed for mounting the spring and for releasing the arm from the tension of the spring when desired. When the tension device is in engagement with the belt, it will maintain the belt at the proper tension for driving the upper pulley 80 from the lower pulley 79 and it will yield to the movement of the parts incident to the action of the scale when the material, through the operation of the machine, is removed from the bin and transferred to the dough mixer.

The means for mounting the vibratory sifter is adapted for use in connection with and without the weighing mechanism and when used in connection with the weighing mechanism the combined guide and bearing 45 not only permits the longitudinal reciprocatory movement and the lateral oscillatory movement, which is similar to the hand action, but the said comb'ned guide and bearing also permits of a vertical pivotal or tilting movement of the sifter and the rod or member to enable the crank element, which is carried by the weighing mechanism, to move upward and downward without interfering with its rotary movement and its proper actuation of the sifter.

What I claim is:

1. A machine of the class described, including a weighing mechanism, a bin or receptacle carried by the weighing mechanism, means also carried by the weighing mechanism for conveying material from the bin and for elevating the material, means for sifting the material in an elevated position and driving mechanism mounted independently of the weighing mechanism and connected with the said means and provided with means for permitting upward and downward movement of the bin and the elevating and conveying means incident to the operation of the weighing mechanism.

2. A machine of the class described, including weighing mechanism, a bin carried by the weighing mechanism, an elevator also mounted on the weighing mechanism, a lower conveyer extending from the bin to the elevator, and an upper conveyer projecting from the upper portion of the elevator, and means for receiving material from the upper conveyer having a slidable connection with the same.

3. A machine of the class described, including a weighing mechanism, a bin mounted upon the weighing mechanism, an elevator also carried by the weighing mechanism, means for conveying the material from the bin to the elevator, an upper conveyer projecting from the elevator and provided with an outlet, a dough mixer arranged to receive material from the said upper conveyer, and driving mechanism for transmitting motion from the dough mixer to the elevator provided with means for compensating for the movement of the weighing mechanism.

4. A machine of the class described, including weighing mechanism, a bin carried by the weighing mechanism, an elevator also mounted on the weighing mechanism, means for conveying material from the bin to the elevator, an upper conveyer projecting from the elevator, and driving mechanism mounted independently of the weighing mechanism and connected with the elevator and provided with means for compensating for the movement of the weighing mechanism.

5. A machine of the class described, including weighing mechanism, a bin mounted upon the weighing mechanism, an elevator also carried by the weighing mechanism, means for conveying material from the bin to the elevator, an upper conveyer projecting from the elevator and provided with an outlet, a movable sifter arranged to receive material from the outlet, driving mechanism mounted independently of the weighing mechanism for actuating the elevator, conveyer and sifter and connected with the same, said driving mechanism being provided with means for permitting up and down movement of the parts incident to the operation of the weighing mechanism.

6. A machine of the class described, including weighing mechanism, a bin carried by the weighing mechanism, an elevator also mounted upon the weighing mechanism, means for conveying material from the bin to the elevator, an upper conveyer projecting from the elevator near the top thereof and having an outlet, and bracing means extending from the elevator to the upper conveyer and the bin to form a rigid structure.

7. A machine of the class described, including a weighing mechanism, an elevator mounted on the weighing mechanism, a bin located at one side of the elevator, an upper conveyer projecting at the opposite side of the elevator, a lower conveyer extending from the bin to the elevator, and a bracing element secured to the elevator at the top thereof and having oppositely extending inclined members extending in opposite directions to the outer portions of the upper conveyer and the bin.

8. A machine of the class described, including weighing mechanism, a bin mounted upon the weighing mechanism, an elevator carried by the weighing mechanism, a lower conveyer extending from the bin to the elevator, an upper conveyer extending from the elevator, and driving mechanism connected with the elevator and the conveyers and provided with means for permitting the upward and downward movement of the bin, the elevator and the conveyers incident to the operation of the weighing mechanism.

9. A machine of the class described, including weighing mechanism, a bin mounted upon the weighing mechanism, an elevator carried by the weighing mechanism, a lower screw conveyer extending from the bin to the elevator, an upper screw conveyer projecting from the elevator, an agitator operating within the bin and connected with the lower conveyer, and driving mechanism for operating the elevator and conveyers and the agitator having means for compensating for the upward and downward movement of the parts incident to the operation of the weighing mechanism.

10. A machine of the class described, including a bin, an elevator, a screw conveyer for conveying the material from the bin to the elevator, upper conveying means extending from the upper portion of the elevator and having an outlet, an agitator operating within the bin and connected with and actuated by the screw conveyer, and means for weighing the material within the bin without interfering with the operation of the conveyors and agitators.

11. A machine of the class described, including a bin provided with a plurality of compartments, an elevator, a screw conveyer extending along the compartments of the bin for conveying the material thereof to the elevator, an agitator mounted in the bin and provided with arms arranged at intervals along the conveyer and operating within the said compartments, said agitator being actuated by the screw conveyer and upper conveying means extending from the elevator and having an outlet and means for weighing the material within the bin without interfering with the operation of the conveyors and agitators.

12. A machine of the class described, including a bin, an elevator, lower conveying means for conveying material from the bin to the elevator, a receiver, upper conveying means extending from the elevator and discharging into the receiver, a sifter operating within the receiver, and means common to the elevator, conveying means and the sifter for operating the same, and means for weighing the material within the bin without interfering with the operation of the conveyors and agitators.

13. A machine of the class described, including a bin, an elevator weighing mechanism carrying the bin and elevator, lower conveying means for conveying material from the bin to the elevator, a receiver, upper conveying means extending from the elevator to the receiver, a vibratory sifter mounted for longitudinal reciprocatory and lateral oscillatory movement and means common to the sifter, the elevator, and the conveying means for actuating the same.

14. A machine of the class described, including a bin, an elevator weighing mechanism carrying the bin and elevator, lower conveying means for conveying material from the bin to the elevator, a receiver, upper conveying means extending from the elevator to the receiver, a vibratory sifter mounted for longitudinal reciprocatory and lateral oscillatory movement and for vertical oscillatory movement, and means for actuating the sifter, the elevator and the conveying means.

15. A machine of the class described, including a bin, an elevator weighing mechanism carrying the bin and elevator, lower conveying means for conveying material from the bin to the elevator, a receiver, upper conveying means extending from the elevator to the receiver, a vibratory sifter having a rod, a crank element connected with the rod, a combined guide and bearing receiving the rod and permitting a longitudinal reciprocatory and a lateral and vertical oscillatory movement and means for operating the elevator and the conveying means and for rotating the crank element.

16. A machine of the class described, including a bin, an elevator weighing mechanism carrying the bin and elevator, lower conveying means for conveying material from the bin to the elevator, a receiver, upper conveying means extending from the elevator to the receiver, a vibratory sifter having a rod, a crank element connected with the rod, a combined guide and bearing having an opening to receive the rod and provided with opposite convex walls to permit longitudinal reciprocatory and lateral and vertical oscillatory movement and means for actuating the sifter, the elevator and the conveying means.

17. A machine of the class described, including a bin, an elevator weighing mechanism carrying the bin and elevator, lower conveying means for conveying material from the bin to the elevator, a receiver, upper conveying means extending from the elevator to the receiver, a vibratory sifter having a rod, a crank element connected with the rod, a combined guide and bearing having an opening receiving the said rod and permitting longitudinal reciprocatory and lateral oscillatory movement, said opening being vertically elongated to permit a vertical tilting or pivoting movement of the rod and sifter and means for actuating the sifter, the elevator and the conveying means.

18. A machine of the class described, including a bin, an elevator means for conveying the material from the bin to the elevator, a receiver open at the top and bottom and having a door at the side, means for conveying material from the elevator to the receiver, a sifter operating within the receiver and removable through the door thereof, and means common to the elevator and the conveying means for operating the same.

19. A machine of the class described, including a bin, an elevator, upper conveying means extending from the elevator, a dough mixer having a drive shaft, a sifter located between the upper conveying means and the dough mixer, a vertical shaft gearing connecting the lower end of the vertical shaft with the drive shaft, and upper gearing connecting the vertical shaft with the sifter, and the elevator and the conveying means.

20. A machine of the class described, including a bin, an elevator, upper conveying means extending from the elevator, a dough mixer having a drive shaft, a sifter located between the upper conveying means and the dough mixer, a vertical shaft gearing connecting the lower end of the vertical shaft with the drive shaft, upper gearing connecting the vertical shaft with the sifter, the elevator and the conveying means, and clutches controlling the operation of the sifter and the elevator and conveying means.

21. A machine of the class described, including a bin, an elevator, upper conveying means extending from the elevator, a dough mixer having a drive shaft, a sifter located between the upper conveying means and the dough mixer, a vertical shaft gearing connecting the lower end of the vertical shaft with the drive shaft, upper gearing connecting the vertical shaft with the sifter, the elevator and conveying means, a lower clutch controlling the operation of the vertical shaft and an upper clutch controlling the operation of the elevator and conveying means.

22. A machine of the class described, including a bin, an elevator, upper conveying means extending from the elevator, a dough mixer having a drive shaft, a sifter located between the upper conveying means and the dough mixer, a vertical shaft gearing connecting the lower end of the vertical shaft with the drive shaft, a rotary gear element carried by the upper end of the vertical shaft and having an eccentric element connected with and actuating the sifter, and means for transmitting motion from the vertical shaft to the elevator and conveying means.

23. A machine of the class described, including a bin, an elevator, upper conveying means extending from the elevator, a dough mixer having a drive shaft, a sifter located between the upper conveying means and the dough mixer, a vertical shaft gearing connecting the lower end of the vertical shaft with the drive shaft, a rotary gear element carried by the upper end of the vertical shaft and having an eccentric element connected with and actuating the sifter, a horizontal shaft located at the upper end of the vertical shaft, a vertical gear mounted on the horizontal shaft and meshing with the rotary gear element and gearing connecting the horizontal shaft with the elevator and conveying means.

24. A machine of the class described, including a bin, an elevator, upper conveying means extending from the elevator, a dough mixer having a drive shaft, a sifter located between the upper conveying means and the dough mixer, a vertical shaft gearing connecting the lower end of the vertical shaft with the drive shaft, a rotary gear element carried by the upper end of the vertical shaft and having an eccentric element connected with and actuating the sifter, a horizontal shaft located at the upper end of the vertical shaft, a vertical gear mounted on the horizontal shaft and meshing with the rotary gear element, gearing connecting the horizontal shaft with the elevator and conveying means, and an upper clutch for controlling the last mentioned gearing and the operation of the elevator and conveying means.

25. A machine of the class described, including a bin, an elevator, upper conveying means, a sifter receiving material from the upper conveying means, a vertical shaft composed of sections, a sleeve connecting the sections and permitting relative slidable movement, gearing connected with the lower end of the vertical shaft for actuating the same, a rotary gear element carried by the upper end of the vertical shaft and having a crank element connected with and actuating the sifter, and gearing for transmitting motion from the vertical shaft to the elevator and conveying means.

26. A machine of the class described, including a bin, an elevator weighing mechanism carrying the bin and elevator, upper conveying means extending from the elevator, a receiver arranged to receive material from the upper conveying means, a sifter operating within the receiver, means for supporting the receiver including spaced posts, and a rod connected with the posts and with the receiver.

27. A machine of the class described, including a bin, an elevator weighing mechanism carrying the bin and elevator, conveying means extending from the elevator, a dough mixer, a receiver arranged between the upper conveying means and the dough mixer, spaced posts mounted on the dough mixer, a rod connecting the posts and supporting the receiver and a sifter operating within the receiver.

28. In a machine of the class described, including a bin, an elevator, upper conveying means, a scale having the elevator and bin mounted upon it, and drive mechanism for operating the elevator and the conveying means, a portion of the driving mechanism being carried by the scale in the movement thereof.

29. In a machine of the class described, including a bin, an elevator, upper conveying means, a scale having the elevator and bin mounted upon it, and drive mechanism for operating the elevator and the conveying means, a portion of the driving mechanism being carried by the scale in the movement thereof, said driving mechanism being provided with means for permitting the up and down movement of the weighing mechanism and the parts carried thereby without interfering with the operation of the said driving mechanism.

In testimony whereof I hereby affix my signature.

FRANK X. LAUTERBUR.